United States Patent [19]

Muller

[11] 3,982,642
[45] Sept. 28, 1976

[54] METHOD AND ARRANGEMENT FOR STORING AND TRANSPORTING PAPER SHEETS

[75] Inventor: Hans Müller, Barenhubel, Switzerland

[73] Assignee: Grapha-Holding AG, Hergiswil, Switzerland

[22] Filed: Nov. 21, 1975

[21] Appl. No.: 634,173

[30] Foreign Application Priority Data
Nov. 27, 1974 Switzerland.................. 15821/74

[52] U.S. Cl.................................. 214/301; 212/9; 212/11; 212/84; 212/97; 212/127; 214/152; 214/309
[51] Int. Cl.².......................................... B66C 17/00
[58] Field of Search ............ 214/301, 309, 658, 87, 214/88, 152; 212/9, 11, 14, 40, 42, 84, 97, 127, 135

[56] References Cited
UNITED STATES PATENTS 3,244,273  4/1966  Wiklund ......................... 214/152 X
3,400,843  9/1968  Johnson............................. 214/309

Primary Examiner—Robert G. Sheridan
Assistant Examiner—George F. Abraham
Attorney, Agent, or Firm—Michael J. Striker

[57] ABSTRACT

Method of storing and transporting individual paper sheets abutting against each other to form a staple of sheets, in which a precompressed staple of sheets resting between upright support members on a support surface of a first magazine is gripped at opposite ends by clamping jaws of a gripper, which compresses the staple further to a self-supporting body, whereafter the body is lifted from between the support members of the first magazine and transported between support members of a second magazine, spaced from the first, at which the body is then relaxed by removing the clamping jaws; and an arrangement for carrying out the method.

7 Claims, 4 Drawing Figures

METHOD AND ARRANGEMENT FOR STORING AND TRANSPORTING PAPER SHEETS

BACKGROUND OF THE INVENTION

The present invention relates to a method of storing and transporting individual paper sheets which abut with faces thereof against each other to form an elongated staple of sheets, as well as to an arrangement for carrying out the method. In printing plants, especially in printing plants used for the production of newspapers, the problem arises to store printed paper sheets for certain time periods until the sheets are subjected to further operating steps. For storing the paper sheets the same may be palettized or as a staple surrounded by a bandage placed upon each other. The first solution requires expenditures for the necessary palettes, whereas the second solution requires expenditure for the band material, for tying the band material around a staple of sheets and for subsequently removing the band material again during further operational steps.

SUMMARY OF THE INVENTION

It is an object of the present invention to provide a method of storing and transporting paper sheets which avoids the disadvantages of such methods known in the art.

It is a further object of the present invention to provide a method of the aforementioned kind which obviates the necessity of providing bandages around a staple of sheets during storing and transporting thereof.

With these and other objects in view, which will become apparent as the description proceeds, the method according to the present invention for storing and transporting individual paper sheets which abut with faces thereof against each other to form an elongated staple of sheets mainly comprises the steps of placing the staple compressed in longitudinal direction to a predetermined length onto a planar substantially horizontal support surface of a first magazine between upright stationary support members thereon spaced from each other a distance slightly greater than the predetermined length so that the support members will engage endmost sheets of the staple, gripping the staple with clamping jaws arranged to pass by said support members and further compressing the staple in longitudinal direction by the clamping jaws to form a self-supporting body from said sheets, removing the body by means of the clamping jaws from between the support members of the first magazine, transporting the body clamped by the clamping jaws between support members of another magazine spaced from each other the same distance as in the first magazine and placing the body onto the planar support surface of the second magazine, and moving the gripper members away from each other and from said endmost sheets of the staple relax the latter until the amendment sheets of the staple engage the support members of the second magazine to thereby hold the staple in slightly compressed condition between the support members of the second magazine.

The arrangement for carrying out the above method mainly comprises at least two spaced magazines having each a planar horizontal support surface and upright support members upwardly projecting therefrom spaced from each other a distance substantially equal to the length of the precompressed staple and arranged to engage portions of the endmost sheets of a precompressed staple placed therebetween, gripper means having a pair of opposite clamping jaws arranged and constructed to engage such portions of the endmost sheets of a staple placed between the support members of one of said magazines which are not engaged by the support members of said one magazine, and means connected to the clamping jaws for moving the same between an inactive position spaced from each other a distance greater than the length of the precompressed staple and an active position in which the distance between the clamping jaws is smaller than the aforementioned length to thereby compress the staple to a self-supporting body held between the clamping jaws, and means for moving the gripper means with the compressed body held between said clamping jaws between said two magazines.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
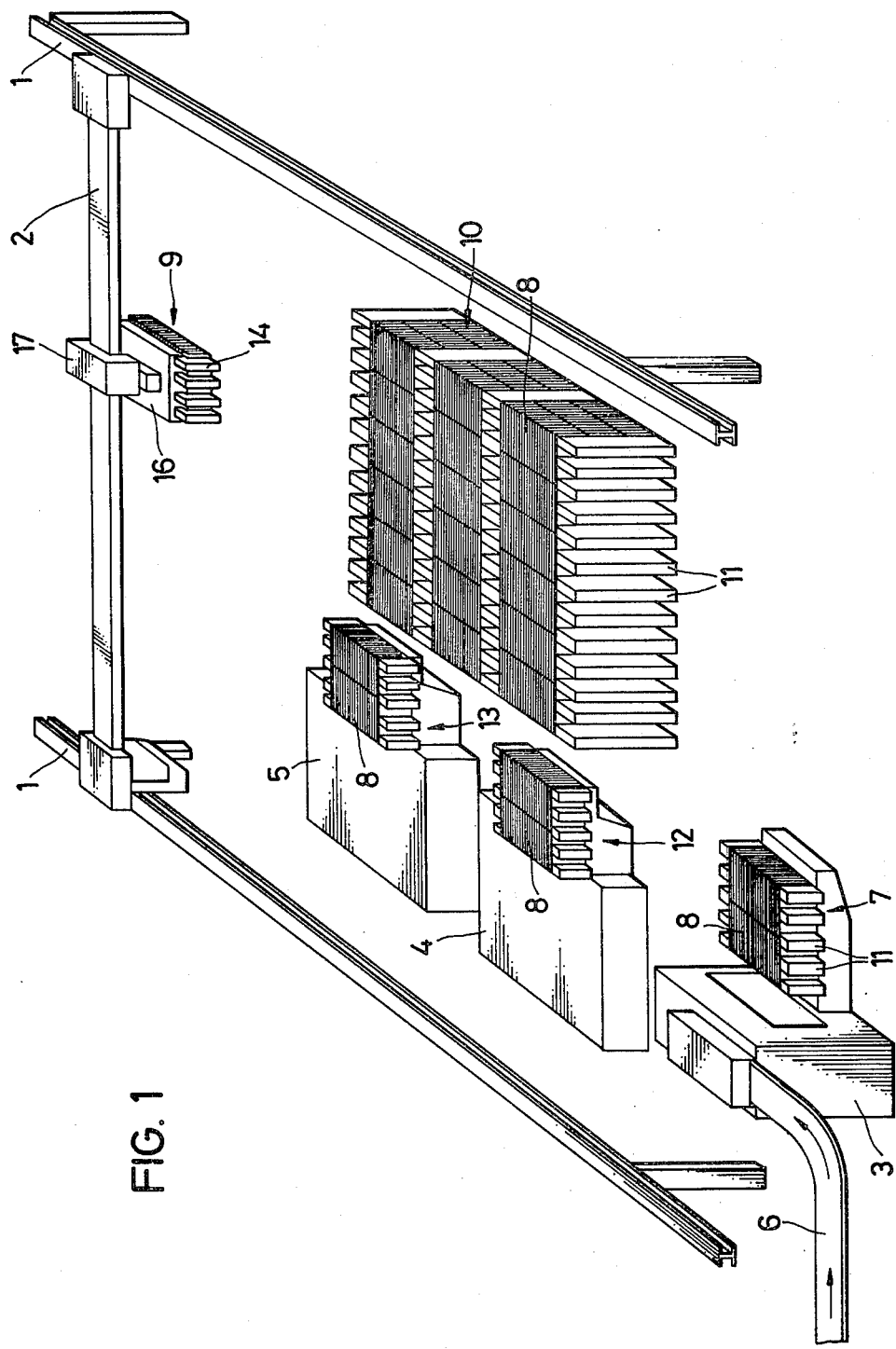
FIG. 1 is a schematic perspective view of the arrangement according to the present invention.

Referring now to the drawing, and more specifically to FIG. 1 of the same, it will be seen that the arrangement according to the present invention comprises a pair of elongated transversely spaced parallel overhead rails 1 on which an overhead crane 2, schematically illustrated in FIG. 1 is movable in longitudinal direction of the rails. The rails extend over a production area on which a paper staple forming machine 3 and two machines 4 and 5 for further processing the staple emanating from the machine 3 are mounted. A stream of overlapping, folded, printed paper sheets transported on a transport band 6 to the staple forming machine 3 is later on over the machines 4 and 5, which may be inserting machines or similar machines, again returned into the manufacturing process. Such a process may for instance comprise combining of freshly printed news containing papers of a newspaper with prior printed literary portions thereof. Before return of the printed paper sheets into the finishing process, the oncoming printed sheets have to be stored in a magazine. The stream of overlapping sheets of papers is for this purpose transported by the band 6 into a machine 3 for forming staples 8 of equal length in which successive sheets abut with faces thereof against each other and the thus formed staple 8 is placed between support members 11 of a first magazine 7 adjacent the machine 3. Such machines for transforming a stream of overlapping paper sheets into a staple of sheets are known in the art and for instance disclosed in the copending application of the same inventor filed under the title "Apparatus for Transforming a Stream of Overlapping Paper Sheets into a Staple of Sheets", on Nov. 21, 1975 under the Ser. No. 634,174. The staples 8 in the magazine 7 are subsequently gripped by the gripper means 9 suspended on the overhead crane 2, further compressed to form from the staple 8 a self-supporting body which is lifted from the magazine 7 and placed on additional magazines 10 until its further processing by the machines 4 and 5. The additional magazines 10 comprise a plurality of parallel rows of support members 11 arranged in each row uniformly spaced from each other, to provide between the individual support members 11 of each row uniform spaces or gaps of a width $d$. The distance $L_1$ between the rows of support members 11 is constant and this distance is slightly greater than the length of the body formed by the compressed staple. The staples 8 stored in the magazines 10 are, when required, that is when the printed sheets are to be returned into the finishing process, gripped in the magazines 10 by the gripper 9, again compressed to form a self-supporting body and placed into the magazines 12 and 13, respectively, of the further operating machines 4 and 5 at which the staples 8 are relaxed so as to abut with endmost sheets thereof onto the support members 11 of the magazines 12 or 13.

Figure 2:
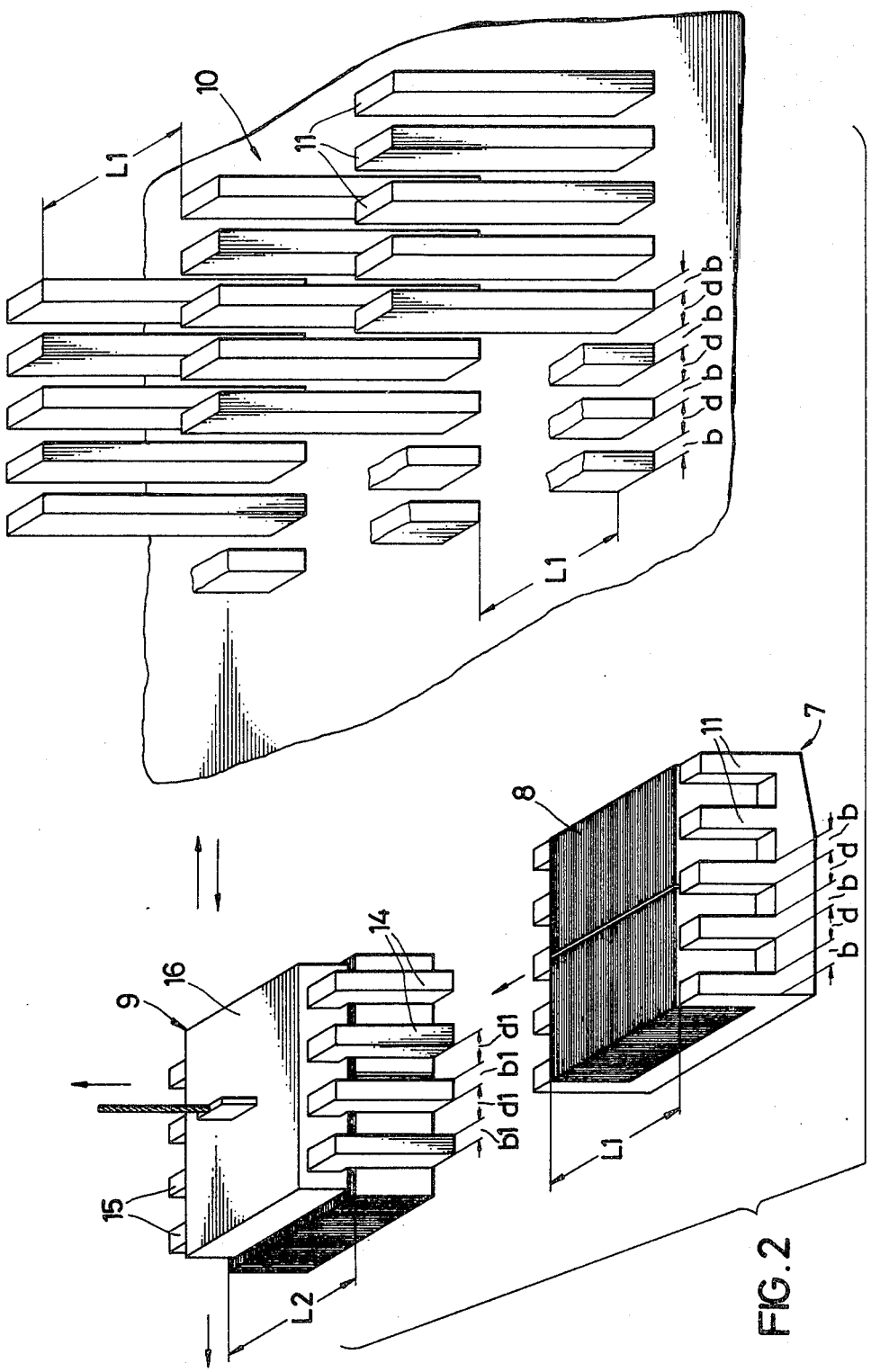
FIG. 2 is a perspective view of details of FIG. 1 drawn to an enlarged scale.
Figure 3:
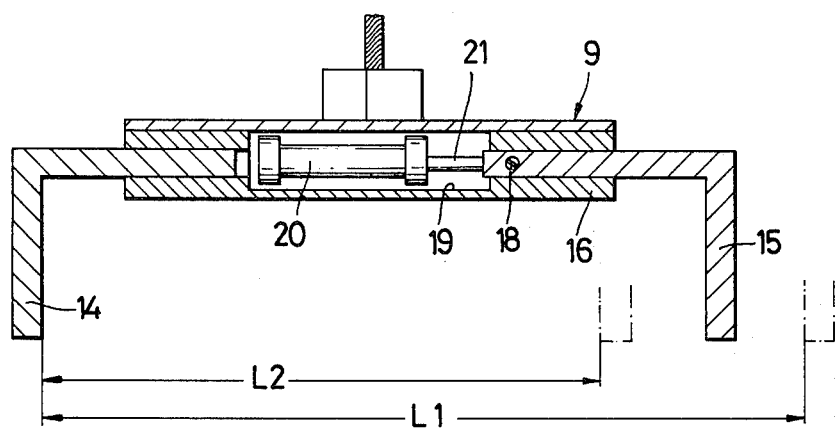
FIG. 3 is a longitudinal cross-section of the gripper means of the arrangement.
Figure 4:
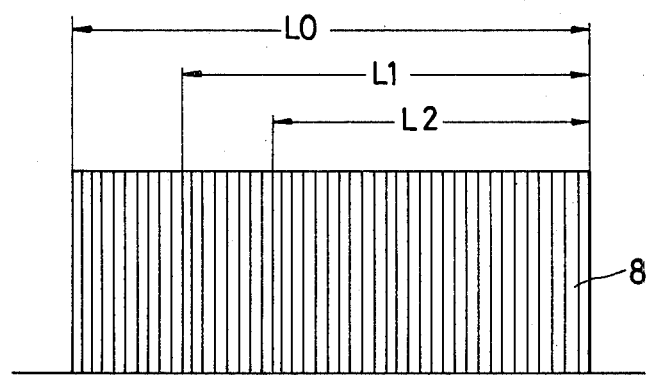
FIG. 4 is a longitudinal cross-section through a paper staple.

The magazines 7, 12 and 13 are in principle of the same construction as the magazine 10. Each of these magazines comprises a horizontally extending support surface provided at opposite ends thereof with support members 11 arranged in two groups or rows spaced from each other a distance $L_1$ as in the magazines 10 and the support members in each row are spaced from each other in transverse direction for a distance $d$. As shown in FIGS. 2 and 3, the gripper means 9 has two rake-like constructed clamping jaws 14 and 15 in which each of the clamping jaws comprises a plurality of fingers which are transversely spaced from each other a distance $d1$ greater than the width $b$ of each support member 11 and having each a width $b1$ slightly smaller than the gap $d$ between adjacent support members 11 so that the fingers of the clamping jaws 14 and 15 may move between supporting members 11 of the respective magazine. As shown in FIG. 3, each of the fingers of the clamping jaws has a vertical portion and a horizontal portion. The horizontal portions of the fingers of the jaw 14 are fixedly connected to a carrying block or plate means 16, whereas the horizontal portions of the fingers of the jaw 15 are guided for movement in longitudinal direction in the block 16 and are connected to each other for simultaneous movement by a cross-pin 18. A cylinder-and-piston unit is located in a cavity 19 formed in the block 16 between the inner ends of the horizontal portions of the fingers of the clamping jaws and the cylinder 20 of this unit is fixedly connected to the block 16, whereas the piston rod 21 is connected at its free end to the cross-pin 18. Non-illustrated conduits connected to opposite ends of the cylinder 20 serve to selectively feed pressure fluid to opposite sides of the piston in the cylinder to thereby move the fingers of the clamping jaws 15 between the two end positions shown in dashed-dotted lines in FIG. 3. The gripper means 9 are supported on the trolley 17 of the overhead crane 2 which is provided in a known manner with lifting means to raise and lower the gripper means 9. In this way the fingers of the clamping jaws 14 and 15 may be lowered between the support members 11 in the magazines 7, 10, 12 and 13 until the clamping jaws 14 and 15 engage opposite ends of a staple of papers therein. Thereby, the movable clamping jaws 15 must be moved to its extended position so that it is spaced from the stationary clamping jaw 14 by the distance $L_1$. The loose staple 8 formed in the machine 3 for forming staples has a length $L_1$ and this staple is compressed in the machine to a length $L_2$ (FIG. 4) until it forms a self-supporting body which in this form is placed from the machine 3 into the magazine 7 where it is relaxed to the length $L_1$. In order to transport the staple 8 from the magazine 7 in one of the magazines 10, the gripper means 9 are lowered over the magazine 7 until the fingers of the clamping jaws 14 and 15 engage the staple 8 at opposite ends between the support members 11. Subsequently thereto pressure fluid is fed into the cylinder-and-piston unit 20, 21 to move the clamping jaw 15 toward the stationary clamping jaw 14 to thereby compress the staple 8 to the length $L_2$ (FIG. 4). The staple 8 is thereby in part elastically and part plastically deformed so that, when released, it will again expand in longitudinal direction. The staple 8 is compressed by the clamping jaws 14 and 15 in such a manner that it forms during the subsequent transport into one of the magazines 10 a self-supporting body. The gripper means 9 with the staple 8 is lowered above one of the magazines 10 until the staple 8 will rest on the bottom surface of the respective magazine or on a staple already deposited thereon. Subsequently thereto the fingers of the clamping jaw 15 are moved outwardly between the respective support members 11 and the gripper means 9 raised. The staple 8 relaxes thereby again to the length $L_1$ and will abut at opposite ends against the support members 11 of the magazine 10. The length $L_1$ is chosen in such a manner so that the staple 8 will still be compressed to a certain extent so that the paper sheets of one staple cannot move between the paper sheets of a staple thereunder. The transport of the staples 8 from the magazines 10 in one of the magazines 12 or 13 will proceed in the same manner as described above.

It will be understood that each of the elements described above, or two or more together, may also find a useful application in other types of methods and arrangements for storing and transporting paper sheets, differing from the types described above.

While the invention has been illustrated and described as embodied in a method and arrangement for storing and transporting paper sheets in form of a staple of sheets abutting with the faces thereof against each other and in which the thus-formed staple is compressed in longitudinal direction during its transport, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of storing and transporting individual paper sheets which abut with faces thereof against each other to form an elongated staple of sheets, comprising the steps of placing a staple of sheets compressed in longitudinal direction to a predetermined length onto a planar substantial horizontal support surface of a first magazine between upright stationary support members thereon spaced from each other a distance slightly greater than said predetermined length so that said support members will engage endmost sheets of the staple; gripping the endmost sheets of the staple with clamping jaws arranged to pass by said support members and further compressing the staple in longitudinal direction by the clamping jaws to form a self-supporting body from said sheets; removing said body by means of said clamping jaws from between said support members of said first magazine; transporting said body held by the clamping jaws between support members of another magazine spaced from each other the same distance as in said first magazine and placing the body onto the planar support surface of the second magazine; and moving the clamping jaws away from each other and from said endmost sheets of the staple to relax the latter until the endmost sheets of the staple engage the support members of the second magazine to thereby hold the staple in slightly compressed condition between the support members of said second magazine.

2. An arrangement for storing and transporting a precompressed staple of individual paper sheets abutting against each other, comprising at least two spaced magazines having each a planar horizontal support surface and upright support members upwardly projecting therefrom spaced from each other a distance substantially equal to the length of the precompressed staple and arranged to engage portions of the endmost sheets of a precompressed staple placed therebetween; gripper means having a pair of opposite clamping jaws arranged and constructed to engage such portions of the endmost sheets of a staple placed between support members of one of the magazines which are not engaged by the support members of said one magazine, and means connected to the clamping jaws for moving the same between an inactive position spaced from each other a distance slightly greater than the length of the precompressed staple, and an active position smaller than said length to thereby compress the staple to a self-supporting body held between the clamping jaws; and means for moving said gripper means with the compressed body held between the clamping jaws from the one magazine to another.

3. An arrangement as defined in claim 2, wherein said support members of each magazine comprises two rows of upright support members arranged opposite and spaced from each other said distance and in which the support members of each row are transversely spaced from each other by gaps of equal widths, and wherein each of said clamping jaws comprises a plurality of fingers having each a width smaller than the gap between adjacent support members and transversely from each other to fit between adjacent support members.

4. An arrangement as defined in claim 3, wherein each of said fingers has a vertical portion adapted to engage portions of endmost sheets of the staple and a horizontal portion integral with said vertical portion, said gripper means further comprising plate means supporting the horizontal portions of the fingers of one clamping jaw in fixed position and the horizontal portions of the finger of the other clamping jaw axially spaced from those of said one clamping jaw and movable toward and away from the latter, said means for moving said clamping jaws between said positions thereof comprising fluid operated cylinder-and-piston means connecting said plate means and said movable jaw.

5. An arrangement as defined in claim 4, wherein said cylinder-and-piston means is arranged in said plate means between spaced ends of said horizontal portions of said fingers.

6. An arrangement as defined in claim 3, wherein said moving means for said gripper means comprises two parallel overhead rails transversely spaced from each other, an overhead crane movable on said rails and having a trolley provided with lifting means connected to said plate means.

7. An arrangement as defined in claim 3, and comprising a depot area in which a plurality of said magazines are arranged end-to-end and in which each two of end-to-end arranged magazines are separated from each other by a common row of support members.

* * * * *